United States Patent [19]
Kojima et al.

[11] Patent Number: 5,796,228
[45] Date of Patent: Aug. 18, 1998

[54] METHOD OF CONTROLLING ROTARY MAGNET MULTI-PHASE SYNCHRONOUS MOTOR AND CONTROL THEREFOR

[75] Inventors: Sadaaki Kojima; Hiroshi Araki; Satoru Kato, all of Tokyo, Japan

[73] Assignee: Mitsubishi Denki Kabushiki Kaisha, Tokyo, Japan

[21] Appl. No.: 823,579

[22] Filed: Mar. 25, 1997

[30] Foreign Application Priority Data

Sep. 4, 1996 [JP] Japan ................... 8-234290

[51] Int. Cl.⁶ .................................................. G05B 19/31
[52] U.S. Cl. ...................... 318/605; 318/661; 364/571.01
[58] Field of Search ................. 318/568.19, 568.22, 318/600–605, 640, 652–670, 700; 364/571.01–571.08; 324/207.11–207.26; 340/870.3–870.38

[56] References Cited

U.S. PATENT DOCUMENTS

| | | | |
|---|---|---|---|
| 4,070,665 | 1/1978 | Glennon et al. | 341/115 |
| 4,207,505 | 6/1980 | Falck et al. | 318/595 |
| 4,458,332 | 7/1984 | Veale | 364/571 |
| 4,472,669 | 9/1984 | Denham et al. | 318/661 |
| 4,525,656 | 6/1985 | Kato . | |
| 4,712,106 | 12/1987 | McNally | 340/870.32 |
| 4,721,188 | 1/1988 | Araki et al. . | |
| 4,774,448 | 9/1988 | Yoshitomi . | |
| 4,792,739 | 12/1988 | Nakamura et al. | 318/661 |
| 4,984,147 | 1/1991 | Araki . | |
| 5,034,874 | 7/1991 | Araki . | |
| 5,134,397 | 7/1992 | Eyerly et al. | 341/116 |
| 5,138,564 | 8/1992 | Jong et al. | 364/571.04 |
| 5,256,943 | 10/1993 | German | 318/685 |
| 5,285,029 | 2/1994 | Araki . | |
| 5,374,883 | 12/1994 | Morser | 318/605 |
| 5,390,102 | 2/1995 | Araki . | |
| 5,400,240 | 3/1995 | Araki . | |
| 5,436,823 | 7/1995 | Araki . | |
| 5,453,684 | 9/1995 | Nakayama | 324/207.12 |
| 5,594,670 | 1/1997 | Yamamoto | 364/571.01 |
| 5,642,461 | 6/1997 | Lewis | 388/812 |

FOREIGN PATENT DOCUMENTS

| | | |
|---|---|---|
| 1129796 | 5/1969 | Japan . |
| 5976191 | 5/1994 | Japan . |

*Primary Examiner*—Brian Sibcus
*Attorney, Agent, or Firm*—Leydig, Voit & Mayer, Ltd.

[57] ABSTRACT

A method of controlling a rotary magnet multi-phase synchronous motor and a control system based on this method increases the permissible range of accuracy in installing a position detector on the synchronous motor and automatically calculates a phase correction to improve controllability. Using a position detector for detecting a magnet position of a rotary magnet multi-phase synchronous motor and a drive unit, the synchronous motor having the position detector is driven by a drive unit. After the synchronous motor reaches a constant speed, current and drive voltage of the synchronous motor are measured to calculate a phase correction value between a biaxial coordinate axis based upon the installation error of the position detector and a biaxial coordinate system from conversion of a polyphase AC coordinate system based on the measured current and drive voltage, constants of the synchronous motor, and the constant speed. The rotor position of the synchronous motor is corrected based on this phase correction value.

16 Claims, 12 Drawing Sheets

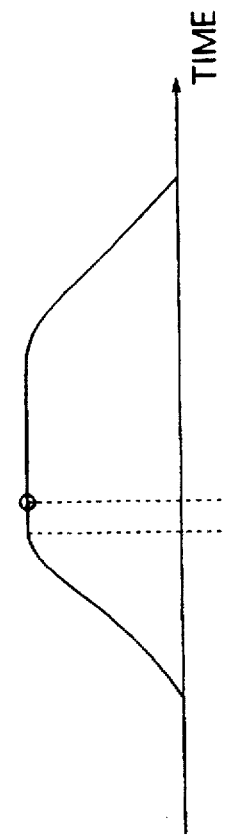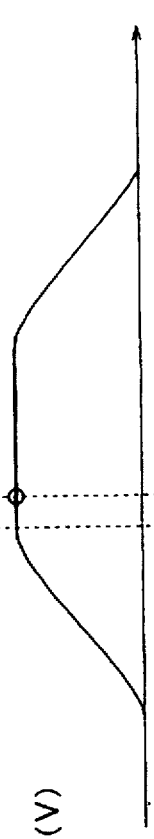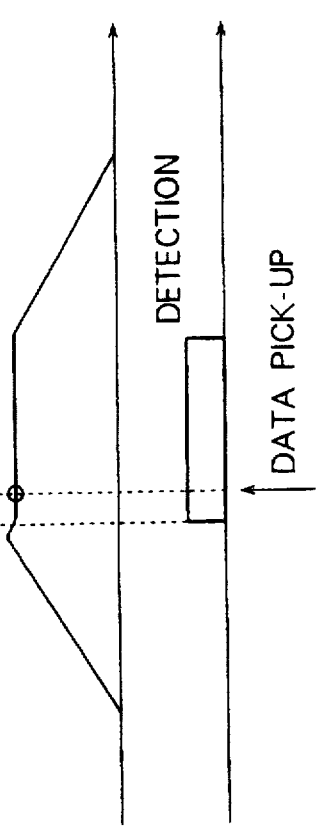
FIG. 4 (a) MOTOR SPEED (ωr) (K20)
FIG. 4 (b) ARMATURE CURRENT (I)
FIG. 4 (c) SPEED ELECTROMOTIVE FORCE (V)
FIG. 4 (d) MOTOR PHASE VOLTAGE (E)
FIG. 4 (e) CONSTANT-SPEED DETECTION TIMING SIGNAL (K24)

METHOD OF CONTROLLING ROTARY MAGNET MULTI-PHASE SYNCHRONOUS MOTOR AND CONTROL THEREFOR

BACKGROUND OF THE INVENTION

1. Field of the Invention

The present invention relates to a method of controlling a rotary magnet type multi-phase synchronous motor and further to a control system based upon this method.

2. Description of the Related Art

For vector control of a permanent magnet type synchronous motor, there has commonly been proposed a technique in which an absolute position detector is attached to or incorporated into the permanent magnet type synchronous motor to two reference points: a reference point of a stator winding and a reference point of a rotor magnet so that the detected absolute position information is given to a control system to use it as a phase at the conversion into a d-q coordinate system.

A detailed description will be made hereinbelow of a known example with reference to FIGS. 10 to 13. FIG. 10 is a block diagram showing a detailed arrangement of a control system, FIG. 11 is an illustration of an equivalent circuit corresponding to one phase of a permanent magnet type synchronous motor, FIG. 12 is an illustration of vectors in a permanent magnet type synchronous motor in the case that a d-axis current is controlled to zero, and FIG. 13 is an illustration of vectors in a permanent magnet type synchronous motor in the case that an installation error occurs on an absolute position detector.

In the illustrations, the same or corresponding parts are marked with -the same reference numerals. Numeral 1 represents a permanent magnet type synchronous motor, numeral 2 designates an absolute position detector for detecting an absolute position (J1) taken in connection with the rotation of a rotor of the permanent magnet type synchronous motor 1, numeral 3 denotes a rotor angular velocity computing unit for performing an operation for an angular velocity of the rotor of the permanent magnet type synchronous motor 1 on the basis of the position output (J1) of the absolute position detector 2, and numeral 5 depicts a three-phase/two-phase converter for converting three phase alternating currents (I1u, I1v, I1w) flowing in the permanent magnet type synchronous motor 1 into currents (I1d, I1q) in a biaxial rotating coordinate system (d-q axis coordinate system) rotating in synchronism with a frequency of an alternating voltage applied to a stator winding of the permanent magnet type synchronous motor 1.

Further, numeral 4 stands for a two-phase/three-phase converter for converting a voltage command value in a d-q coordinate system into a three-phase voltage command value, numeral 6 indicates a d-axis current controller for amplifying the difference between a d-axis component command (I1dcom) of a stator winding current of the permanent magnet type synchronous motor 1 and the actual value (I1d) thereof to make a current flow to achieve the command value, numeral 7 represents a q-axis current controller for controlling a q-axis component of the stator winding current of the permanent magnet type synchronous motor 1, and numeral 8 designates a velocity controller for controlling the rotor angular velocity (ω r) of the permanent magnet type synchronous motor 1 according to a command value (ω rcom).

Still further, numeral 9 denotes a phase computing unit for performing an operation of an electric angular phase (Th) of the rotor on the basis of the position output (J1) of the absolute position detector 2, with this electric angular phase (Th) being indicative of a rotational angle in the d-q axis coordinate system viewed from an α–β where the phase axis coincides with the u phase axis of the three phases. Moreover, numeral 10 depicts a PWM inverter for converting an alternating-current voltage into a three-phase alternating voltage variable in voltage value and variable in frequency, numeral 11 indicates a current detector for detecting a three-phase alternating current flowing from the PWM inverter 10 to the permanent magnet type synchronous motor 1, and numerals 12, 13 and 14 designate subtracters, respectively.

In this construction, the PWM inverter 10 generates an output with a frequency and a voltage corresponding to the output of the two-phase/three-phase converter 4 to control the rotational speed and the torque of the permanent magnet type synchronous motor 1. The equivalent circuit corresponding to one phase of the permanent magnet type synchronous motor 1 is expressible such that as shown in FIG. 11 an armature current (I) flows when a motor phase voltage (E) is applied to both ends of a circuit comprising a series connection of an armature winding resistor (Ra), an armature winding self inductance (La) and a speed electromotive force (V) due to a permanent magnet.

Accordingly, assuming that the number of armature winding magnetic cross fluxes is taken to be $\phi$, in the case that the d-axis current is controlled to zero (that is, no installation error of the absolute position detector 2), I1d=0 and I1q=I, which satisfies the vector diagram of FIG. 12. In this illustration, Vr represents a voltage drop (Vr=Ra×I) due to the armature current I in the armature winding resistor (Ra), and Vd denotes a voltage drop (Vd=ω 1×La×I) due to the armature current (I) in the armature winding self inductance (La).

In the known control method for a permanent magnet type synchronous motor and a control system based upon this method, the generated torque (T1) in the permanent magnet type synchronous motor 1 when the d-axis current is controlled to zero is expressible by the following equation.

$$T1 = p \times \phi \times I1q,$$

where p denotes a polar logarithm of the permanent magnet type synchronous motor 1.

However, for the incorporation of the absolute position detector 2 into the permanent magnet type synchronous motor 1, if the installation error occurs by a mechanical angle (θ) in the rotating direction, an error develops between the phase recognized by the control system and the actual phase, and hence, even if the permanent magnet type synchronous motor 1 is controlled in a state as shown in FIG. 12, as shown in FIG. 13 the armature current I shifts by an rotational angle (θ 1) from a q-axis to on a q'-axis without coinciding with the q-axis. In this instance, θ 1=p×θ.

The generated torque (T2) in the permanent magnet type synchronous motor 1 in the case that the d-axis current is controlled to zero in this state is expressible by the following equation.

$$T2 = p \times \phi \times I1q \times \cos(p \times \theta)$$

Accordingly, the generated torque decreases by a coefficient of cos (p×θ), and the efficiency of the torque-current characteristic lowers and further the d-axis partial current flows in the permanent magnet type synchronous motor 1, which creates a problem that the permanent magnet is subject to demagnetization.

Moreover, since in the known art the attachment of the absolute position detector 2 to the permanent magnet type synchronous motor 1 is performed manually in accordance with the two reference points: the reference point of the stator winding and the reference point of the rotor magnet, if the polar logarithm of the permanent magnet type synchronous motor 1 is large, the installation accuracy of the absolute position detector 2 becomes exceedingly critical.

SUMMARY OF THE INVENTION

Accordingly, the present invention has been developed with a view to eliminating such problems, and it is an object of the present invention to provide (a) a method of controlling a rotary magnet type multi-phase synchronous motor and (b) a control system based on this method, enlarging the allowable range of installation accuracy of the position detector on the rotary magnet type multi-phase synchronous motor and further offering excellent controllability by correcting the difference in phase between a biaxial coordinate axis to be used for control and a biaxial coordinate system obtained by conversion of a polyphase ac coordinate system.

Another object of the present invention is to, in the case that an elevator winding machine is driven by a rotary magnet type multi-phase synchronous motor, provide a method of controlling a rotary magnet type multi-phase synchronous motor and a control system based upon this method, enlarging the allowable range of installation accuracy of the position detector on the rotary magnet type multi-phase synchronous motor and further correcting the difference in phase between a biaxial coordinate axis to be used for control and a biaxial coordinate system obtained by conversion of a multi-phase alternating coordinate system to produce excellent controllability.

A method of controlling a rotary magnet type multi-phase synchronous motor according to the present invention, which uses a position detector for detecting a magnet position of the rotary magnet type multi-phase synchronous motor and a drive unit for driving the rotary magnet type multi-phase synchronous motor, the control method comprises a step of driving the position detector attached rotary magnet type multi-phase synchronous motor by the drive unit to detect that the rotary magnet type multi-phase synchronous motor reaches a constant speed, a step of measuring a current and a drive voltage of the rotary magnet type multi-phase synchronous motor when reaching the constant speed, a step of calculating a phase correction value between a biaxial coordinate axis to be used for control based on an installation error of the position detector and a biaxial coordinate system due to the conversion of a ployphase ac coordinate system on the basis of the measured current, the measured drive voltage, a constant on the rotary magnet type multi-phase synchronous motor and the constant speed, and a step of correcting a rotor position of the rotary magnet type multi-phase synchronous motor from the position detector on the basis of the calculated phase correction value.

In this control method, the current and drive voltage of the rotary magnet type multi-phase synchronous motor for the calculation of the phase correction value are components of a current and a drive voltage viewed from the polyphase ac coordinate system.

Further, in this control method, the current and drive voltage of the rotary magnet type multi-phase synchronous motor for the calculation of the phase correction value are components of a current and a drive voltage viewed from the biaxial coordinate axis to be used for the control.

Furthermore, in this control method, the phase correction value between the biaxial coordinate axis to be used for the control based on the installation error of the position detector and the biaxial coordinate system due to the conversion of the polyphase ac coordinate system is calculated when the position detector is initially attached to the rotary magnet type multi-phase synchronous motor, and thereafter the rotor position of the rotary magnet type multi-phase synchronous motor from the position detector is corrected on the basis of a stored phase correction value.

In addition, the phase correction value is calculated on the basis of a value calculated in a manner that a value obtained by the subtraction of a voltage drop due to an armature winding self inductance on a q-axis current component from a d-axis voltage component of the biaxial coordinate axis is divided by a value obtained by the subtraction of a voltage drop due to an armature winding resistance on the q-axis current component from a q-axis voltage component.

Furthermore, the phase correction value is taken to be an average value of a phase correction value obtained through the normal rotation of the rotary magnet type multi-phase synchronous motor and a phase correction value obtained by the reverse rotation thereof.

Still further, in this control method, an elevator winding machine is driven by the rotary magnet type multi-phase synchronous motor, and in the operation the phase correction value is calculated in a state that the elevator car and the counterweight are balanced.

Moreover, in this control method, an elevator winding machine is driven by the rotary magnet type multi-phase synchronous motor, and the phase correction value is taken to be an average value of a phase correction value attained through the rotation of the elevator winding machine in the lifting direction and a phase correction value attained through the rotation thereof in the lowering direction.

Moreover, a control system for a rotary magnet type multi-phase synchronous motor comprises a position detector for detecting a magnet position of the rotary magnet type multi-phase synchronous motor, a drive unit for driving the rotary magnet type multi-phase synchronous motor, detection timing detecting means for detecting the fact that the rotary magnet type multi-phase synchronous motor reaches a constant speed, data pick-up means for measuring a current and a drive voltage of the rotary magnet type multi-phase synchronous motor when reaching the constant speed, phase correction value detecting means for calculating the difference in phase between a biaxial coordinate axis to be used for the control based upon an installation error of the position detector and a biaxial coordinate system coming from the conversion of a polyphase ac coordinate system on the basis of the current, the drive voltage, a constant on the rotary magnet type multi-phase synchronous motor and the constant speed, and rotor position correction means for correcting a rotor position of the rotary magnet type multi-phase synchronous motor from the position detector on the basis of a phase correction value detected by the phase correction value detecting means.

Furthermore, in this control system, the current and the drive voltage of the rotary magnet type multi-phase synchronous motor for the calculation of the phase correction value are components of a current and a drive voltage viewed from the polyphase coordinate system.

In addition, in this control system, the current and the drive voltage of the rotary magnet type multi-phase synchronous motor for the calculation of the phase correction value are components of a current and a drive voltage viewed from the biaxial coordinate axis for the control.

Still further, in this control system, the phase correction value between the biaxial coordinate axis to be used for the control based on the installation error of the position detector and the biaxial coordinate system due to the conversion of the polyphase ac coordinate system is calculated when the position detector is initially attached to the rotary magnet type multi-phase synchronous motor, and thereafter the rotor position of the rotary magnet type multi-phase synchronous motor from the position detector is corrected on the basis of a phase correction value stored.

In addition, in this control system, the phase correction value is calculated on the basis of a value calculated in a manner that a value obtained by the subtraction of a voltage drop due to an armature winding self inductance on a q-axis current component from a d-axis voltage component of the biaxial coordinate axis is divided by a value obtained by the subtraction of a voltage drop due to an armature winding resistance on the q-axis current component from a q-axis voltage component.

Further, the phase correction value is taken to be an average value of a phase correction value obtained through the normal rotation of the rotary magnet type multi-phase synchronous motor and a phase correction value obtained by the reverse rotation thereof.

Moreover, in this control system, an elevator winding machine is driven by the rotary magnet type multi-phase synchronous motor, and in the operation the phase correction value is calculated in a state that the elevator car and the counterweight are balanced.

Besides, in this control method, an elevator winding machine is driven by the rotary magnet type multi-phase synchronous motor, and the phase correction value is taken to be an average value of a phase correction value attained through the rotation of the elevator winding machine in the lifting direction and a phase correction value attained through the rotation thereof in the lowering direction.

BRIEF DESCRIPTION OF THE DRAWINGS

The object and features of the present invention will become more readily apparent from the following detailed description of the preferred embodiments taken in conjunction with the accompanying drawings in which:

FIGS. 4(a)–4(e) are timing charts showing the pick-up timings of various data from a permanent magnet type synchronous motor in the first embodiment of this invention;

DESCRIPTION OF THE PREFERRED EMBODIMENTS

First Embodiment

Figure 1:
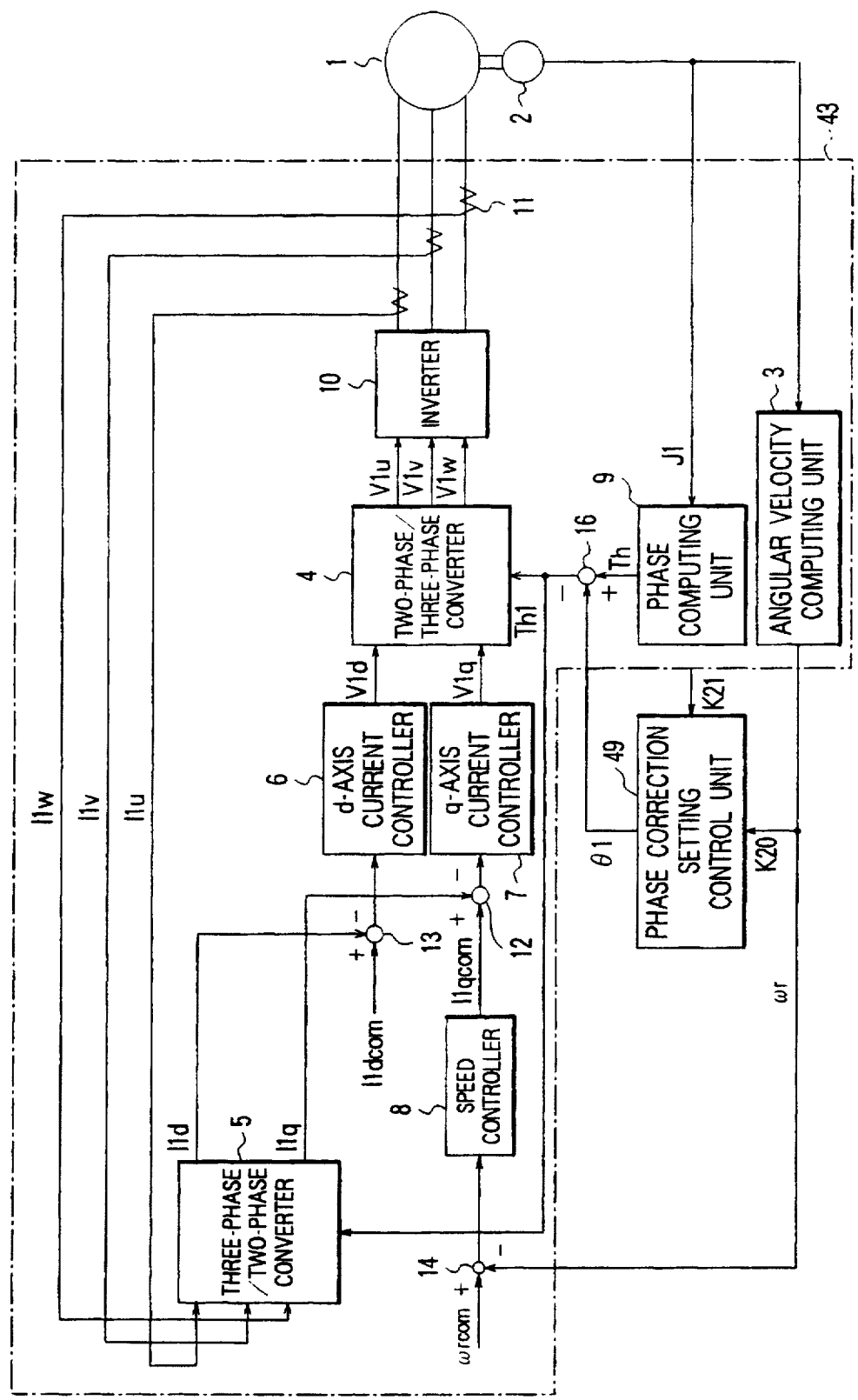
FIG. 1 is a block diagram showing a detailed arrangement of a control system according to a first embodiment of the present invention.
Figure 2:
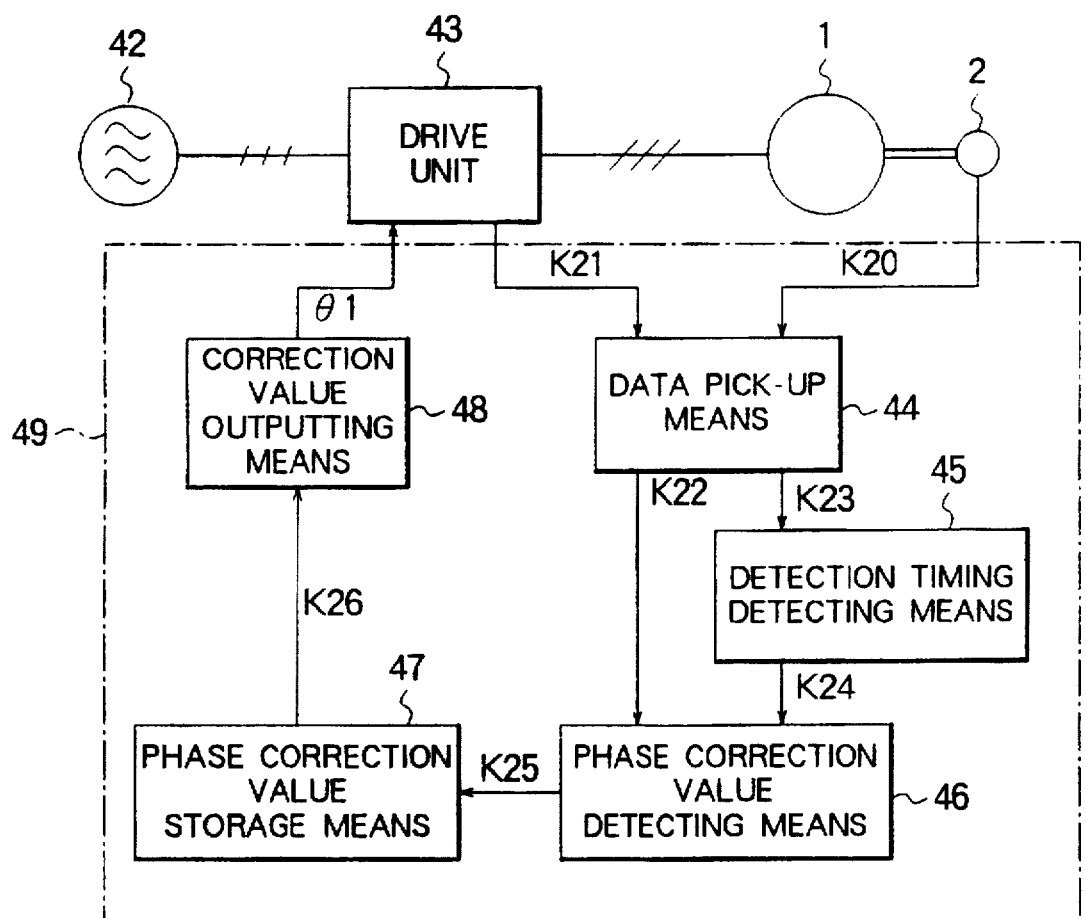
FIG. 2 is a block diagram showing an arrangement of a control unit for phase correction setting in the first embodiment of this invention.
Figure 3:
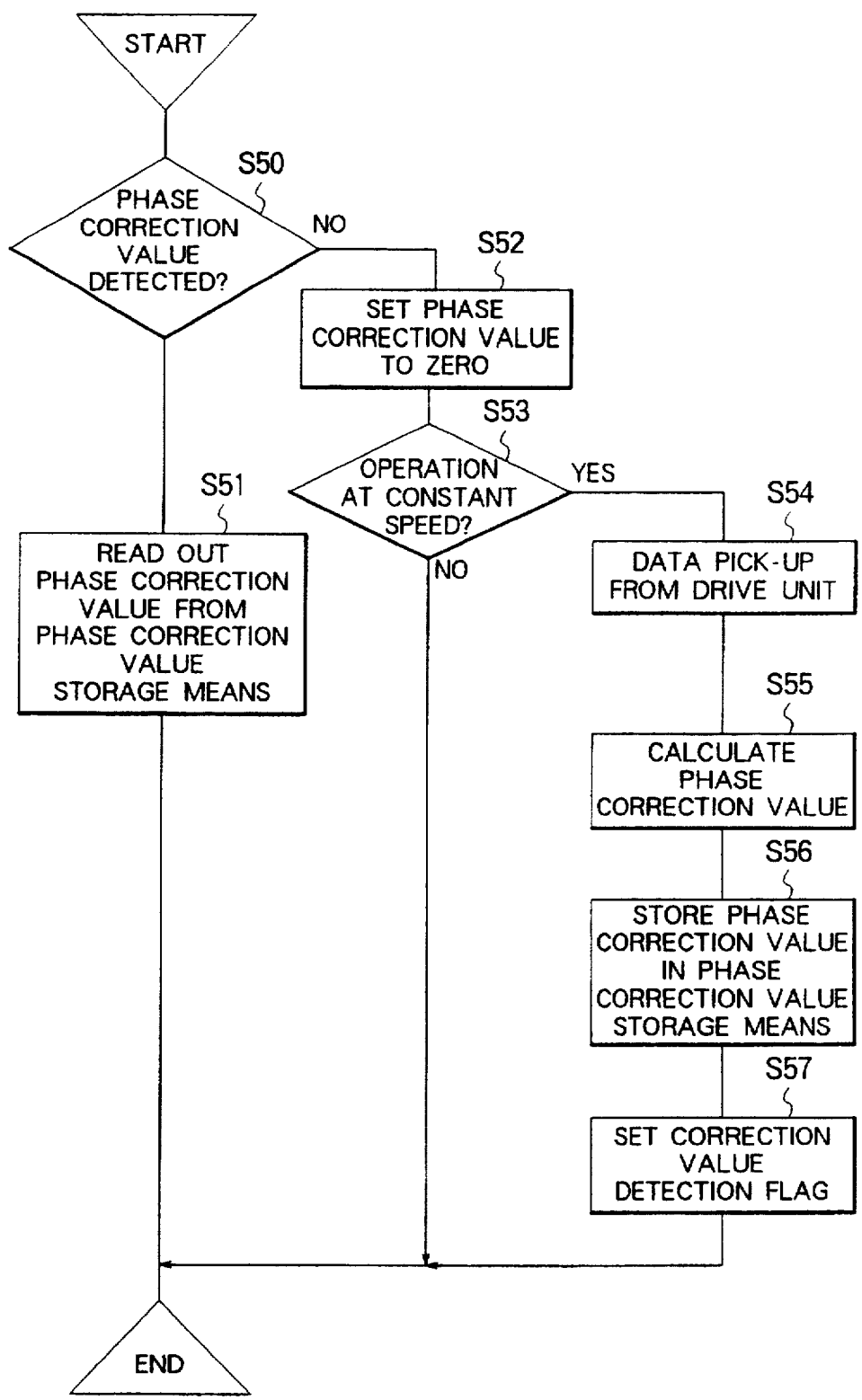
FIG. 3 is a flow chart showing an operation of a control system according to the first embodiment of this invention.

A first embodiment of the present invention will be described hereinbelow with reference to FIGS. 1 to 4. FIG. 1 is a block diagram showing a detailed arrangement of a control system, FIG. 2 is a block diagram showing an arrangement of the control unit for a phase correction setting operation, FIG. 3 is a flow chart showing an operation of the control system, and FIGS. 4(a)–4(e) are timing charts showing the pick-up timings of various data from a rotary magnet type multi-phase synchronous motor (or permanent magnet type synchronous motor).

In the illustrations, parts which are the same as or correspond to those in the above-mentioned example are marked with the same reference numerals. Numeral 16 represents a subtracter for subtracting a phase correction value (θ 1) provided by a phase correction setting control unit 49 from an electric angular phase (Th) provided a phase computing unit 9. Numeral 42 designates a commercial power supply, numeral 43 denotes a drive unit for a rotary magnet type multi-phase synchronous motor 1, and numeral 49 depicts a control unit for phase correction setting for an absolute position detector 2. The absolute position detector 2 comprises a data pick-up (extraction) means 44, a phase correction value detection timing detecting means 45, a phase correction value detecting means 46, a phase correction value storage means 47, and a correction value outputting means 48.

The data pick-up means 44 picks up data from the drive unit 43 and the absolute position detector 2, the phase correction value detection timing detecting means 45 detects a timing for the detection of a phase correction value, the phase correction value detecting means 46 calculates a phase correction quantity at the timing obtained by the phase correction value detection timing detecting means 45, the phase correction value storage means 47 stores the phase correction value attained by the phase correction value detecting means 46, and the correction value outputting means 48 outputs the phase correction value stored in the phase correction value storage means 47.

Secondly, a description will be made hereinbelow of an operation of the phase correction setting control unit 49. First, the absolute position detector 2 is attached to the rotary magnet type multi-phase synchronous motor 1. A correction value detection flag is then reset. Subsequently, for a phase correction quantity calculating operation, the output (θ 1) of the correction value output means 48 is set to zero, and the rotary magnet type multi-phase synchronous motor 1 is driven by the drive unit 43 to be controlled so that the d-axis current becomes zero. The data (K21) from the drive unit 43 and the speed data (K20) (shown by FIG. 4(a)) from the absolute position detector 2 are given to the data pick-up means 44.

The phase correction value detection timing detecting means 45 detects, on the basis of the data (K23) from the data pick-up means 44, the fact that the speed of the rotary magnet -type multi-phase synchronous motor 1 becomes constant, and at that time outputs a constant-speed detection timing signal (K24) as shown by FIG. 4(e) to the correction value detecting means 46. After receiving this constant-speed detection timing signal (K24), the phase correction value detecting means 46 takes in the data (K22) on motor phase voltage (E), shown in FIG. 4(a) and the value of an armature current (I) shown in FIG. 4(b) given from the drive unit 43 through the data pick-up means 44. In addition, a rotational angle (θ 1=p×θ) is calculated in accordance with the following equation.

$$E^2 = (Vr + V \times \cos θ 1)^2 + (Vd + \sin θ 1)^2$$

$$θ 1 = \arcsin(((E^2 - (Ra \times I)^2 - (ω 1 \times La \times I)^2 - V^2)/(2V \times ((Ra \times I)^2 + (ω 1 \times La \times I)^2)^{1/2}) - \arctan(Ra/(ω 1 \times La))$$

where Ra, La denote constants of the rotary magnet type multi-phase synchronous motor 1, ω 1 represents a value obtained from the drive frequency of the rotary magnet type multi-phase synchronous motor 1, and V, as shown in FIG. 4(c), is a speed electromotive force induced in the stator winding, a value obtained from the drive frequency.

Thus, the measurement of the armature current (I) and the motor phase voltage (E) results in allowing the calculation of the rotational angle (θ 1).

The rotational angle (θ 1) calculated in the phase correction value detecting means 46 is stored as a phase correction value (as the data (K25)) in the phase correction value storage means 47. Further, after the incorporation of the absolute position detector 2 into the rotary magnet type multi-phase synchronous motor 1, the correction value detection flag is set, which is indicative of the conducted phase correction value calculating operation. In the following operation, this correction value detection flag is checked, and if being reset, the correction value outputting means 48 reads out as the data (K26) the phase correction value (θ 1) stored in the phase correction value storage means 47 and outputs it to the drive unit 43 to correct the electric angular phase (Th) from the phase computing unit 9.

Moreover, referring to the flow chart of FIG. 3, a description will be given hereinbelow of a method of processing data. First of all, a step S50 is executed in order to check whether the phase correction value has already been detected or not. If already detected, a step S51 follows to read out the phase correction value (θ 1) from the phase correction value storage means 47 and to output it to the drive unit 43 for the phase correction. On the other hand, if not detected, a step S52 follows to set the phase correction value to zero, and then a step S53 follows to check whether or not the rotary magnet type multi-phase synchronous motor 1 is driven at a constant speed. If the motor is not in operation at the constant speed, the processing ends, and if the motor is in operation at the constant speed, the processing advances to a step S54. At this step S54, the data is picked up from the drive unit 43, then followed by a step S55 to calculate the phase correction value (θ 1) and further followed by a step S56 to store this phase correction value (θ 1) in the phase correction value storage means 47. Further, the correction value detection flag is set at a step S57.

As described above in detail, after the initial attachment of the absolute position detector 2 to the rotary magnet type multi-phase synchronous motor 1, the phase correction setting control unit 49 measures the armature current (I) and the motor phase voltage (E) and calculates the phase correction value (θ 1) using the measured values and the other constants of the rotary magnet type multi-phase synchronous motor 1. Using this phase correction value (θ 1), the phase correction control unit 49 controls the armature current (I) to coincide with the q-axis (in the vector illustration of FIG. 13, the d-axis and d'-axis coincide with each other), so that the generated torque decreases by the coefficient of cos (θ 1) to prevent the efficiency of the torque-current characteristic from decreasing. Thus it is possible to eliminate the problem of the demagnetization of the permanent magnet resulting from the d-axis partial current flow in the rotary magnet type multi-phase synchronous motor 1.

In addition, after the incorporation of the absolute position detector into the rotary magnet type multi-phase synchronous motor 1, the phase correction value (θ 1) caused by the installation error of the detector is calculated on the basis of the data obtainable therefrom. Thus even if the installation accuracy is extremely critical unlike the prior art in which the installation accuracy depends upon manual operation, it is possible to coarsely attach the position detector to the synchronous motor which enhances working efficiency.

Further, since the phase correction setting is made using the correction value detection flag only after the initial attachment of the absolute position detector 2 to the rotary magnet type multi-phase synchronous motor 1 and, once set, the phase correction value (θ 1) stored in the phase correction value storage means 47 is used without again performing the phase correction setting, control efficiency can improve.

Moreover, since, data is obtained for the calculation of the phase correction value (θ 1) whether or not the rotary magnet type multi-phase synchronous motor 1 reaches a constant speed, the calculation of an accurate phase correction value (θ 1) is repeatable.

Second Embodiment

Figure 5:
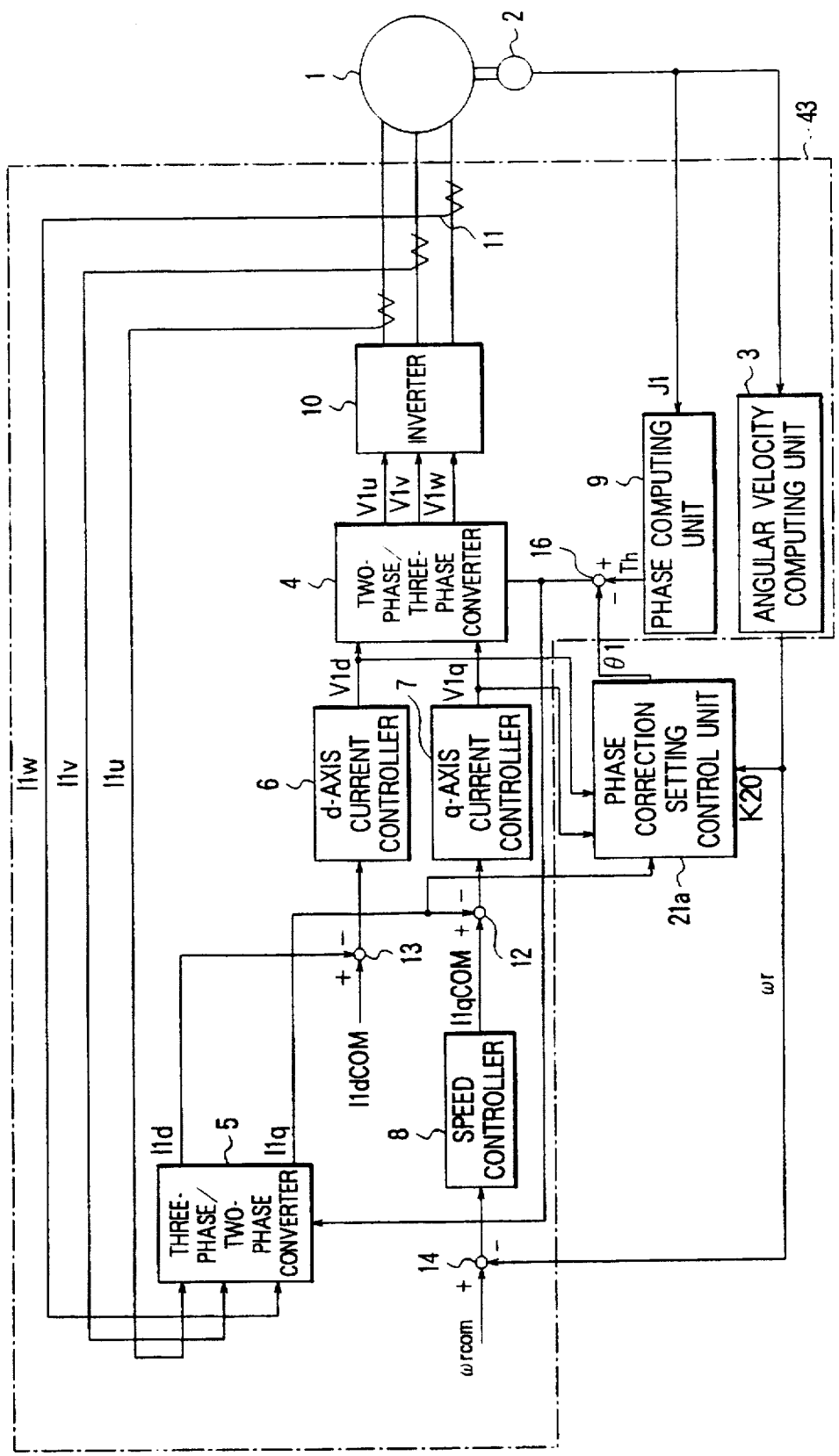
FIG. 5 is a block diagram showing a detailed arrangement of a control system according to a second embodiment of this invention.
Figure 6:
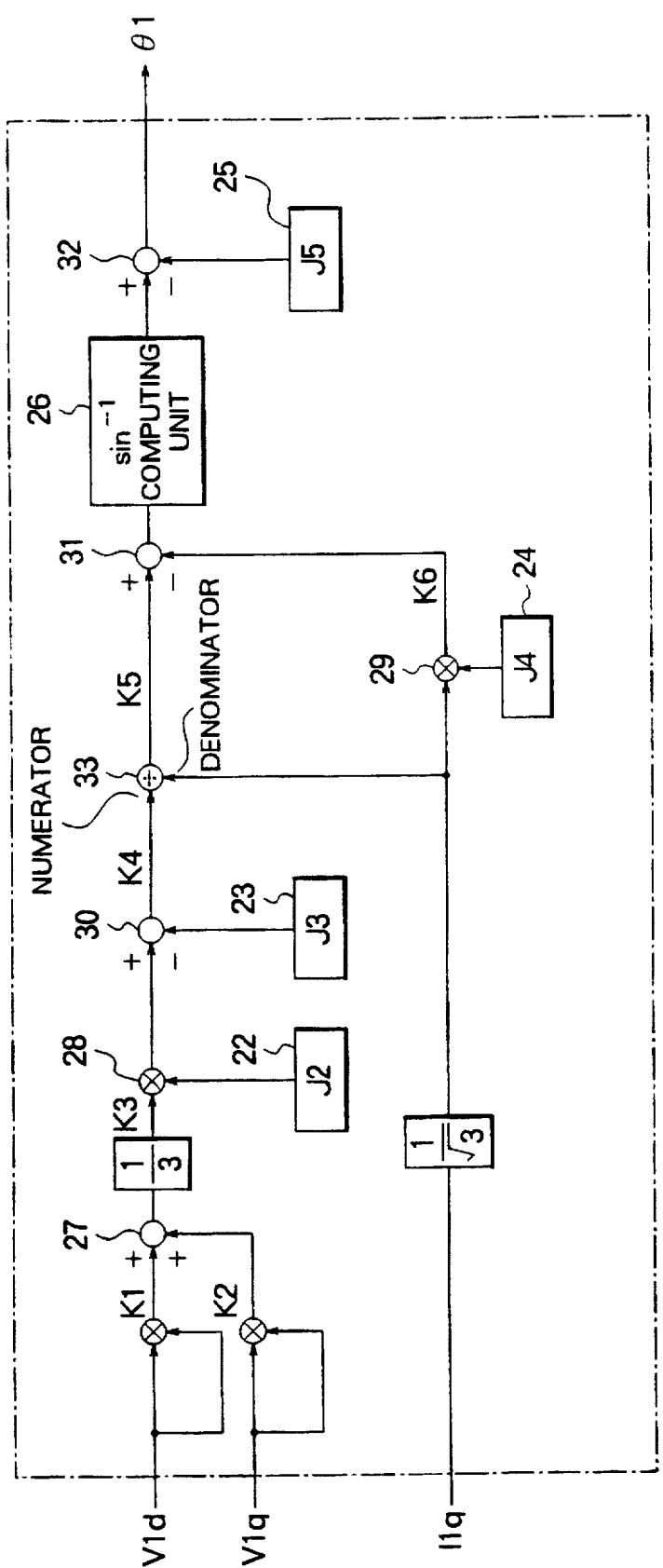
FIG. 6 is a block diagram showing the production of a phase correction value (θ 1) from a controlled quantity of a d-p coordinate axis in the second embodiment of this invention.

Referring to FIGS. 5 and 6, a description will be made hereinbelow of another calculating method of a phase correction value (θ 1) according to a second embodiment of this invention. FIG. 5 is a block diagram showing a detailed arrangement of a control system, and FIG. 6 is a block diagram showing an arrangement for the production of the phase correction value (θ 1) from a controlled quantity on the d-q coordinate axis. In the illustration, parts which are the same as or correspond to those in the prior art example and the first embodiment are marked with the same reference numerals. Numeral 21a represents a control unit for performing the phase correction setting, numeral 22 designates a coefficient J2 computing unit, numeral 23 denotes a coefficient J3 computing unit, numeral 24 depicts a coefficient J4 computing unit, numeral 25 stands for a coefficient J5 computing unit, numeral 26 indicates an arcsin computing unit for computing an input arcsin according to an arcsin table, numeral 27 represents an adder, numerals 28 and 29 designate multipliers, numerals 30, 31 and 32 denote subtracters, and numeral 33 depicts a divider.

In this embodiment, for the phase correction setting made after the initial incorporation of the absolute position detector 2 into the rotary magnet type multi-phase synchronous motor 1, the rotary magnet type multi-phase synchronous motor 1 is driven by the drive unit 43 and controlled so that the d-axis current becomes zero. The speed data (K20) (indicated by (a) in FIG. 4) is derived from the absolute position detector 2. In place of the data (K21) from the drive unit 43 in the first embodiment, the q-axis current I1q, the d-axis voltage V1d and the q-axis voltage V1q are taken from the three-phase/two-phase converter 5, the d-axis current controller 6 and the q-axis current controller 7, respectively.

Further, the phase correction value (θ 1) is calculated in accordance with the following equation.

$$\theta 1 = \arcsin(((V1d^2 + V1q^2)/3 - (Ra \times I1q/3^{1/2})^2 -$$
$$(\omega 1 \times La \times I1q/3^{1/2})^2 - V^2)/(2Vx((Ra \times I1q/3^{1/2})^2 +$$
$$(\omega 1 \times La \times I1q/3^{1/2})^2)^{1/2})) - \arctan(Ra/(\omega 1 \times La))$$

where Ra and La represent constants of the rotary magnet type multi-phase synchronous motor 1, ω 1 designates a value obtained from the drive frequency of the rotary magnet type multi-phase synchronous motor 1, and V denotes a value obtained from the speed electromotive force induced in the stator winding.

Accordingly, if the q-axis current I1q, the d-axis voltage V1d and the q-axis voltage V1q are taken from the three-phase/two-phase converter 5, the d-axis current controller 6 and the q-axis current controller 7, respectively, the calculation of the rotational angle (θ 1) is practicable.

The FIG. 6 circuit is obtainable by transforming the above-mentioned rotational angle (θ 1) calculating equation as follows.

$$\theta 1 = \arcsin((J2 \times (V1d^2+V1q^2)/3 - J3)/(I1q/3^{1/2}) - J4 \times (I1q/3^{1/2})) - J5$$

$$J2 = 1/(2V \times (Ra^2 + (\omega 1 \times La)^2)^{1/2})$$

$$J3 = 1/(2(Ra^2 + (\omega 1 \times La)^2)^{1/2})$$

$$J4 = (Ra^2 + (\omega 1 \times La)^2)^{1/2}/(2V)$$

$$J5 = \arctan(Ra/(\omega 1 \times La))$$

That is, in FIG. 6, the d- and q-axis voltages V1d and V1q inputted are respectively squared, thus obtaining a signal K1=V1d² and a signal K2=V1q². These signals are added in the adder 27 and then divided, thereby attaining a signal K3. This signal K3 is multiplied by the coefficient J2 from the coefficient J2 computing unit 22 in the multiplier 28. The coefficient J3 from the coefficient J3 computing unit 23 is subtracted therefrom in the subtracter 30, thereby obtaining a signal K4. Then, in the divider 33, this signal K4 is divided by a value obtained by dividing the q-axis current I1q by 3^{1/2} thus producing a signal K5. On the other hand, in the multiplier 29 the value obtained by dividing the q-axis current I1q by 3^{1/2} is multiplied by the coefficient J4 from the coefficient J4 computing unit 24, thereby providing a signal K6.

Further, the subtracter 31 subtracts the signal K6 from the signal K5, and the arcsin computing unit 26 calculates a phase angle corresponding to the subtraction result. The subtracter 32 substracts the coefficient J5 of the coefficient J5 computing unit 25 from this phase angle to output the subtraction result as the rotational angle (θ 1). In this case, the phase correction value (θ 1) thus calculated is stored in the phase correction value storage means 47 as shown in FIG. 2 and included in the control unit 21a. In the ordinary operation after the calculation of the phase correction value, the phase correction value (θ 1) is read out from the phase correction value storage means 47 and is subtracted from the electric angular phase (Th) from the phase computing unit 9 in the subtracter 16 for phase correction.

As described above in detail, according to this embodiment, since the phase correction value (θ 1) is calculated on the basis of the values I1q, V1d and V1q being the controlled quantities of the d-q axis coordinate system for use in the drive control of the rotary magnet type multi-phase synchronous motor 1, the calculation of the phase correction value (θ 1) within the control system becomes extremely simple. Hence this embodiment is extremely advantageous in this respect.

Third Embodiment

Figure 7:
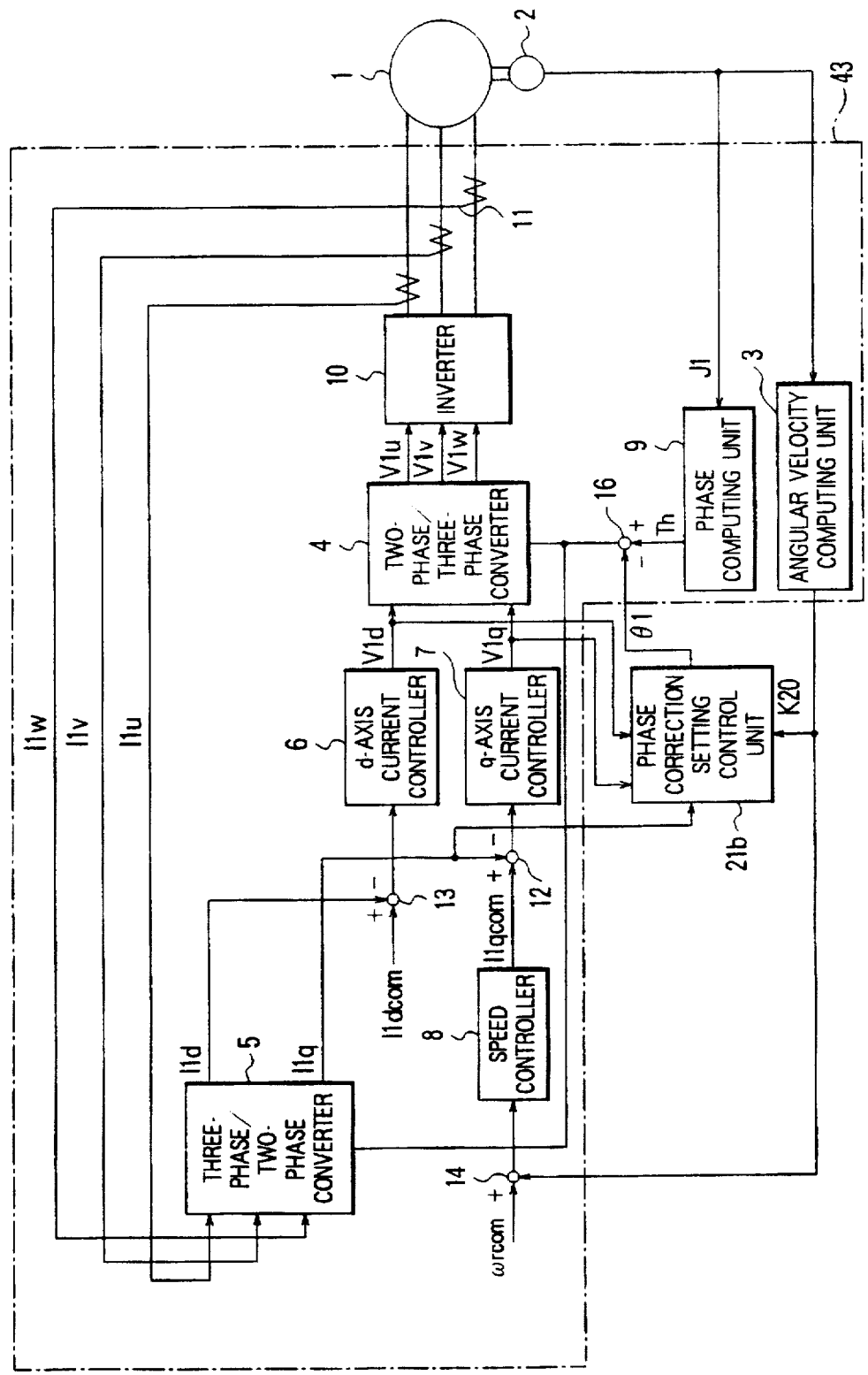
FIG. 7 is a block diagram showing a detailed arrangement of a control system according to a third embodiment of this invention.
Figure 8:
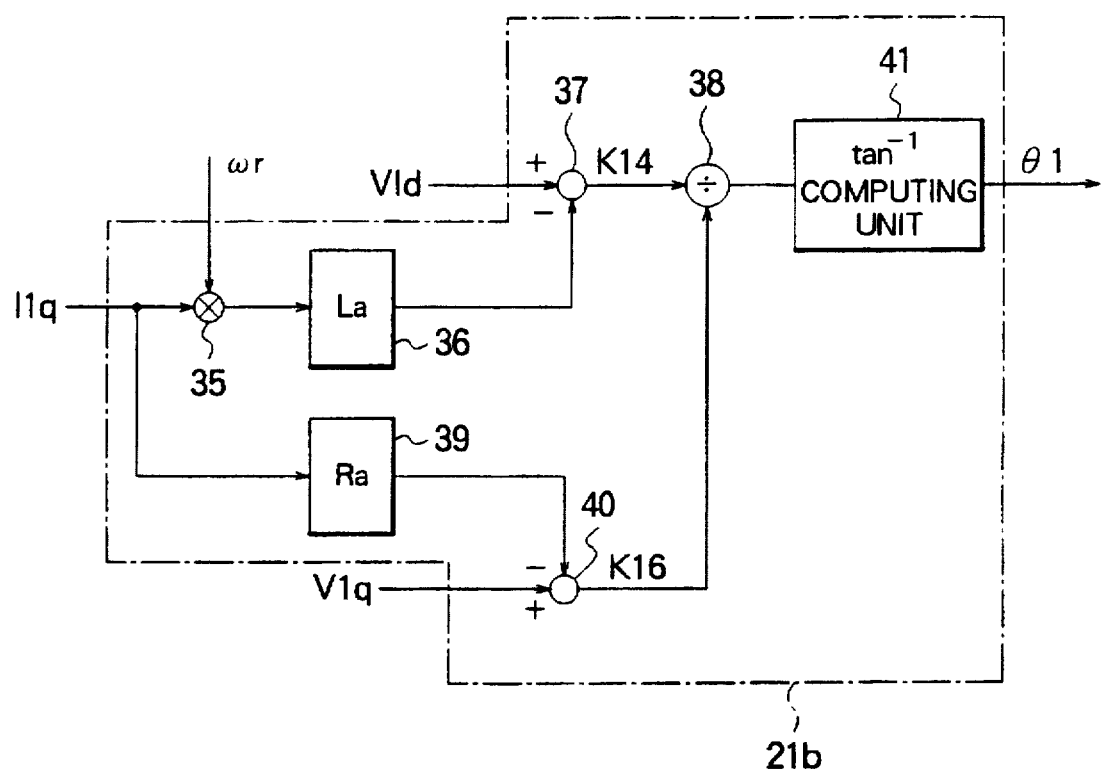
FIG. 8 is a block diagram showing the production of a phase correction value (θ 1) from a controlled quantity of a d-p coordinate axis in the third embodiment of this invention.

Moreover, referring to FIGS. 7 and 8, a description will be made hereinbelow of a further method of calculating the phase correction value (θ 1) according to a third embodiment of this invention. FIG. 7 is a block diagram showing a detailed arrangement of a control system, and FIG. 8 is a block diagram showing an arrangement for the production of the phase correction value (θ 1) from a controlled value on the d-q coordinate axis. In the illustrations, parts which are the same as and correspond to those in the prior art example and the first and second embodiments are indicated by the same reference numerals. Numeral 21b represents a control unit for performing the phase correction setting, numeral 35 designates a multiplier, numerals 36, 39 denote coefficient units for the armature winding resistance (Ra) and the armature winding self inductance (La), respectively, numerals 37, 40 depict subtracters, numeral 38 stands for a divider, and numeral 41 indicates an arctan computing unit for computing the input arctan from an arctan table.

In this embodiment, for the phase correction setting after the initial attachment of the absolute position detector 2 to the rotary magnet type multi-phase synchronous motor 1, the rotary magnet type multi-phase synchronous motor 1 is driven by the drive unit 43 and controlled so that the d-axis current becomes zero. The speed data (K20) (indicated by (a) in FIG. 4) is taken from the absolute position detector 2. As in the second embodiment, the q-axis current I1q, the d-axis voltage V1d and the q-axis voltage V1q are taken from the three-phase/two-phase converter 5, the d-axis current controller 6 and the q-axis current controller 7, respectively, and the electric angular velocity r is picked up from the angular velocity computing unit 3.

Figure 11:
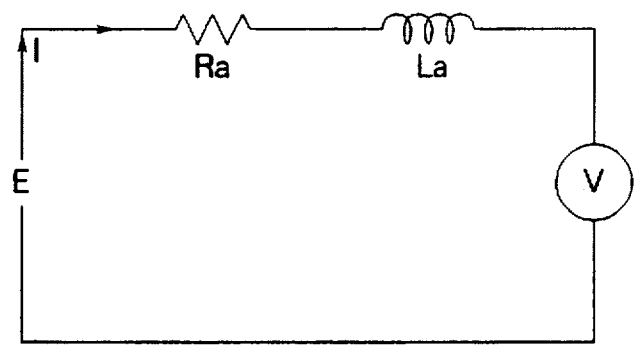
FIG. 11 is an equivalent circuit corresponding to one phase of a prior permanent magnet type synchronous motor.
Figure 12:
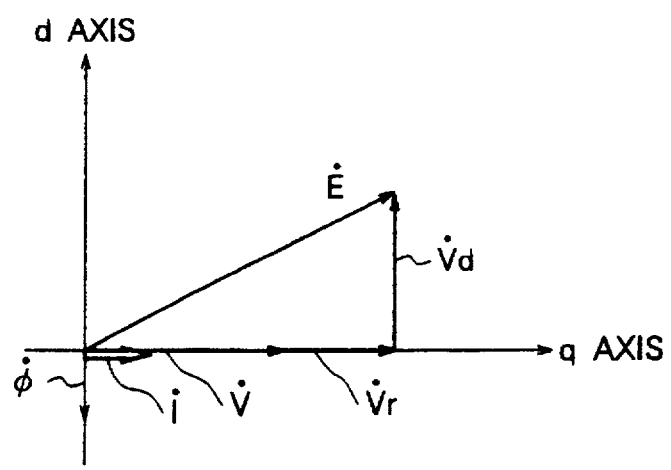
FIG. 12 is an illustration of vectors in a permanent magnet type synchronous motor which arise in the case that a d-axis current is controlled to zero.

Further, the phase correction value (θ 1) can be calculated as follows in view of the equivalent circuit corresponding to one phase of the rotary magnet type multi-phase synchronous motor 1 shown in FIG. 11 and the vector illustration for the rotary magnet type multi-phase synchronous motor 1 in the case of the occurrence of the installation error of the absolute position detector 2 shown in FIG. 13.

$$\theta 1 = \arctan((V1d - \omega r \times La \times I1q)/(V1q - Ra \times I1q))$$

where Ra, La designate the constants of the rotary magnet type multi-phase synchronous motor 1, and ω r denotes a value obtained from the electric angular velocity of the rotary magnet type multi-phase synchronous motor 1. Accordingly, the rotational angle (θ 1) is obtainable in a way that the q-axis current I1q, the d-axis voltage V1d and the q-axis voltage V1q are taken from the three-phase/two-phase converter 5, the d-axis current controller 6 and the q-axis current controller 7, respectively.

More specifically, in FIG. 8, the q-axis current I1q input is multiplied by the electric angular velocity ω r in the multiplier 35, and the product is multiplied by the armature winding self inductance (La) in the coefficient unit 36 and subtracted from the d-axis voltage V1d in the subtracter 37, thus producing a signal K14. On the other hand, the input q-axis current I1q is multiplied by the armature winding resistance (Ra) in the coefficient unit 39, and the product is subtracted from the q-axis voltage V1q in the subtracter 40, thereby providing a signal K16. Moreover, the signal K14 is divided by the signal K16 in the divider 38, and the quotient is inputted to the arctan computing unit 41 so that the phase angle corresponding to the input value is output as the rotational angle (θ 1).

In this case, the phase correction value (θ 1) thus calculated is stored in the phase correction value storage means 47 shown in FIG. 2 and included in the phase correction setting control unit 21a. In the usual operation after the calculation of the phase correction value, the phase correction value (θ 1) stored in the phase correction value storage means 47 is read out and subtracted from the electric angular phase (Th) from the phase computing unit 9 in the subtracter 16 for the phase correction.

As described above in detail, according to this embodiment, since the calculation of the phase correction value (θ 1) is made on the basis of the values I1q, V1d and V1q being the controlled quantities of the d-q axis coordinate system to be used for the drive control of the rotary magnet type multi-phase synchronous motor 1, the calculation of the phase correction value (θ 1) within the control system becomes simple, and hence this embodiment is extremely advantageous in this respect.

Figure 13:
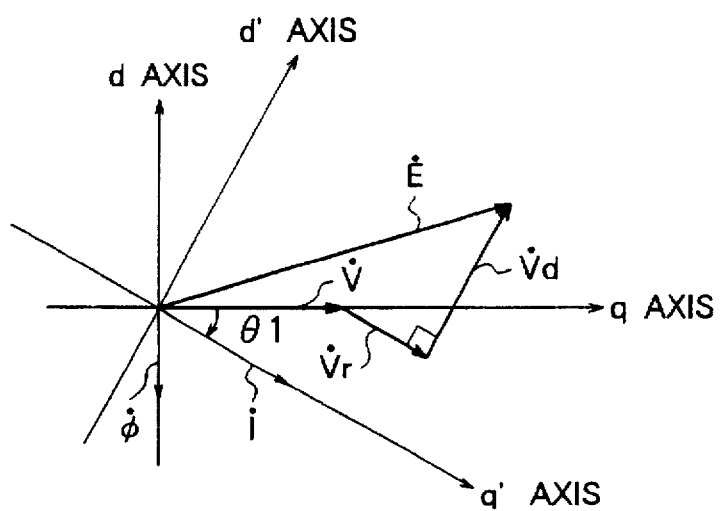
FIG. 13 is an illustration of vectors in a permanent magnet type synchronous motor in the case that an absolute position detector involves an installation error.

Moreover, in addition to the drive frequency (ω 1) the actual electric angular velocity (ω r) obtained in the angular velocity computing unit 3 can also be used as the rotational frequency (ω) of the rotary magnet type multi-phase synchronous motor 1, and since using the calculation equation of the phase correction value (θ 1) coming from the vector illustration of the rotary magnet type multi-phase synchronous motor 1 in the case of the occurrence of the installation error on the absolute position detector 2 as shown in FIG. 13, the circuit arrangement of the control system becomes simplified, which is advantageous.

Fourth Embodiment

Figure 9:
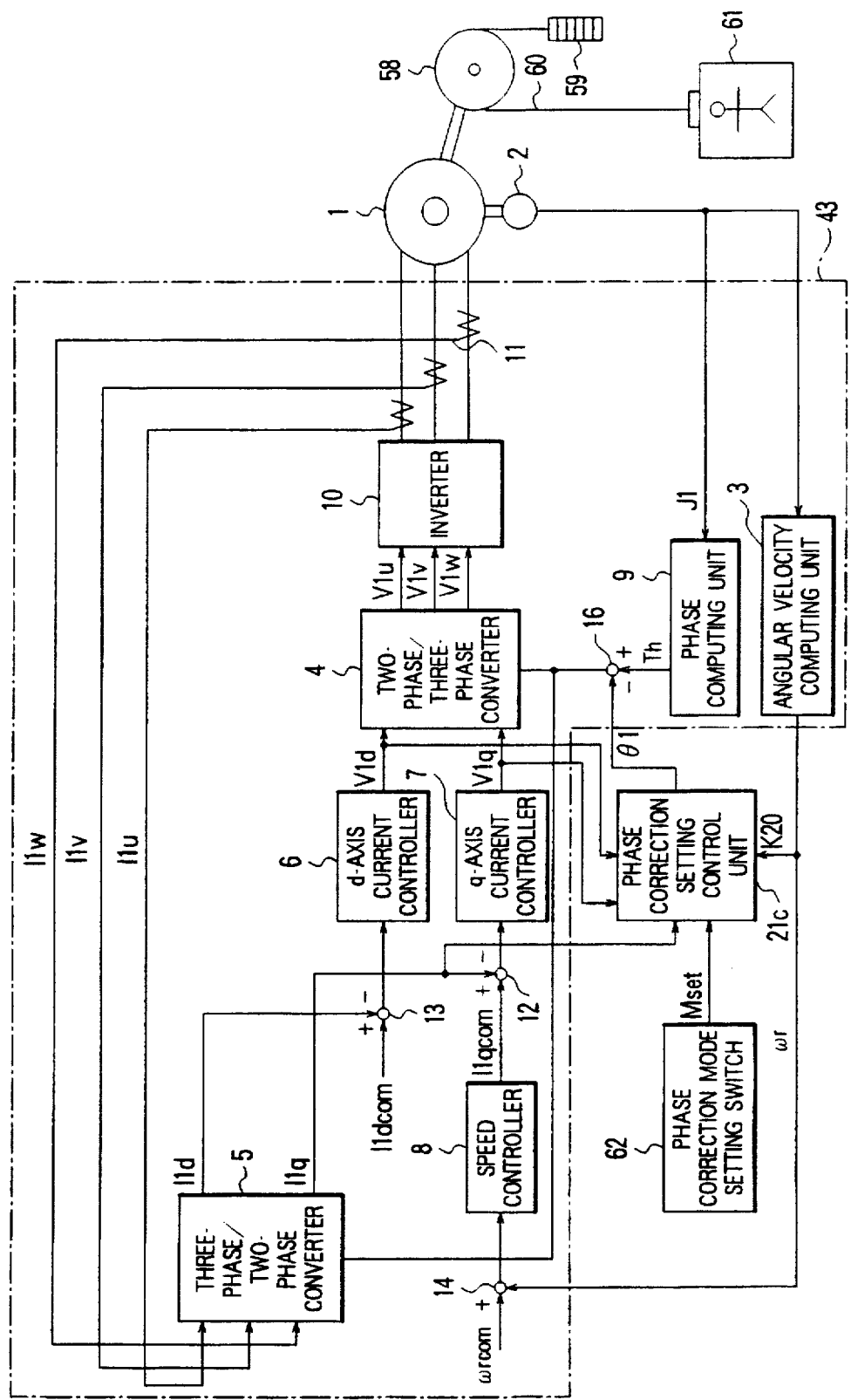
FIG. 9 is a block diagram showing a detailed arrangement of a control system according to a fourth embodiment of this invention.
Figure 10:
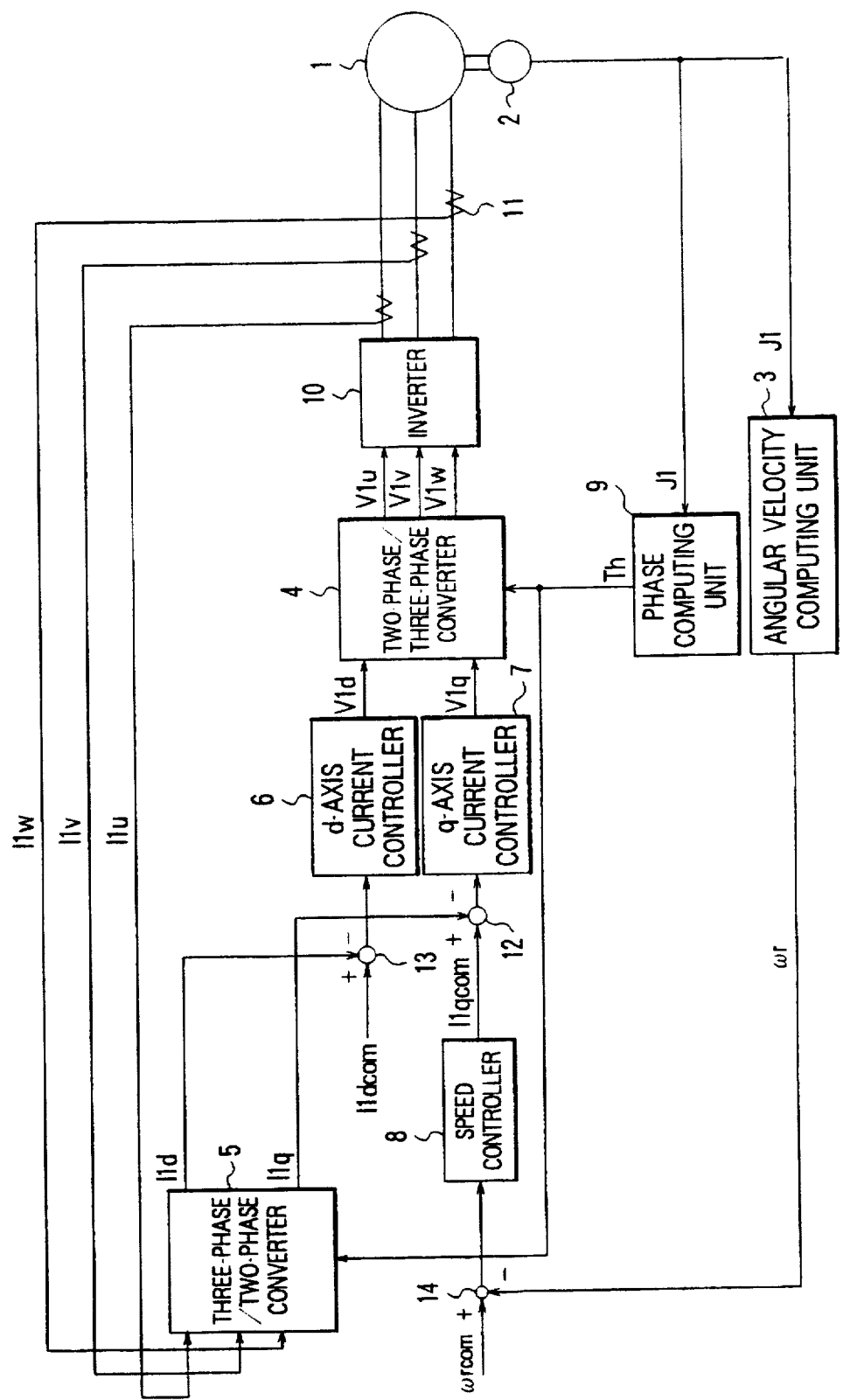
FIG. 10 is a block diagram showing a detailed arrangement of a prior art control system.

Referring now to FIG. 9, a description will be given hereinbelow of an arrangement applying a phase correction setting control unit to an elevator according to a fourth embodiment of this invention. FIG. 9 is a block diagram showing a detailed arrangement of a control system. In the illustration, parts which are the same as or correspond to those in the prior art example and the first to third embodiments are marked with the same reference numerals. Numeral 21c denotes a phase correction setting control unit, numeral 58 depicts a sheave of an elevator winding machine, numeral 59 stands for a counterweight, numeral 60 indicates a rope set on the sheave 58, numeral 61 represents an elevator car, and numeral 62 designates a phase correction mode setting switch.

In this embodiment, for the phase correction setting after the initial attachment of the absolute position detector 2 to the rotary magnet type multi-phase synchronous motor 1, the rotary magnet type multi-phase synchronous motor 1 is driven by the drive unit 43 to be controlled so that the d-axis current becomes zero. The speed data (K20) (indicated by (a) in FIG. 4) is taken from the absolute position detector 2, and, as in the second embodiment, the q-axis current I1q, the d-axis voltage V1d and the q-axis voltage V1q are taken from the three-phase/two-phase converter 5, the d-axis current controller 6 and the q-axis current controller 7, respectively, and the electric angular velocity r is picked up from the angular velocity computing unit 3.

Further, as in the case of the third embodiment, the phase correction value (θ 1) can be calculated as follows in view of the equivalent circuit corresponding to one phase of the rotary magnet type multi-phase synchronous motor 1 shown in FIG. 11 and the vector illustration on the rotary magnet type multi-phase synchronous motor 1 in the case of the occurrence of the installation error of the absolute position detector 2 shown in FIG. 13:

$$\theta 1 = \arctan((V1d - \omega r \times La \times I1q)/(V1q - Ra \times I1q))$$

where Ra, La designate the constants of the rotary magnet type multi-phase synchronous motor 1, and r denotes a value obtained from the electric angular velocity of the rotary magnet type multi-phase synchronous motor 1. Accordingly, the rotational angle (θ 1) is obtainable in a way that the q-axis current I1q, the d-axis voltage V1d and the q-axis voltage V1q are taken from the three-phase/two-phase converter 5, the d-axis current controller 6 and the q-axis current controller 7, respectively.

In this case, in the calculation of the rotational angle (θ 1) according to the above-mentioned equation, the term (ω r×La×I1q) included in the numerator and the term (Ra×I1q) included in the denominator are set to be as small as possible in order to lessen the influence of the value of Ra on the calculation accuracy due to the variation in temperature and the influence of I1q on the calculation accuracy due to the measurement error, which is extremely important for the control system for the rotary magnet type multi-phase synchronous motor 1 for driving the elevator.

For this reason, a balanced load balancing with the counterweight 59 is put in the elevator car 61 and the switching is made from the ordinary control mode to the phase correction mode through the phase correction mode setting switch 62 so that the phase correction value calculating operation is conducted according to the third embodiment.

At this time, first the elevator car 61 is driven in the lifting direction and the phase correction value calculating operation is conducted to obtain the lifting side phase correction value (θ 1u) Subsequently, the elevator car 61 is driven in the lowering direction, and the phase correction value calculating operation is conducted to obtain the lowering side phase correction value (θ 1d). Further, in the subtracter 16, the phase correction value to be subtracted from the electric angular phase (Th) from the phase computing unit 9 is obtained as θ 1=(θ 1u+θ 1d)/2, that is, average value of both the phase correction values is employed.

As described above, according to this embodiment, since the calculation of the phase correction value (θ 1) is made in a state that the load on the rotary magnet type multi-phase synchronous motor 1 is substantially set to zero, it is possible to eliminate the influence on the value of Ra due to the temperature variation and the influence on the value of I1q due to the measurement error which can cause the errors in the calculation of the phase correction value (θ 1). The result is that excellent controllability is attainable which is essential for the drive of the elevator.

In addition, in employing a control system which electronically calculates the phase correction value, it is unnecessary to use special measuring equipment, which is not required for the ordinary control of the elevator, for the calculation of the phase correction value. It is also possible to easily operate the control system within a machine house.

Since arranged as described above, the present invention can inhibit the following effects.

Using a position detector for detecting a magnet position of a rotary magnet type multi-phase synchronous motor and a drive unit for driving the rotary magnet type multi-phase synchronous motor, the rotary magnet type multi-phase synchronous motor equipped with the position detector is driven by the drive unit and, after the rotary magnet type multi-phase synchronous motor reaches a constant speed, the current and drive voltage of the rotary magnet type multi-phase synchronous motor are measured to calculate a phase correction value between a biaxial coordinate axis to be used for the control based upon the installation error of the position detector and a biaxial coordinate system due to the conversion of a polyphase ac coordinate system on the basis of the measured current, the measured drive voltage, the constant of the rotary magnet type multi-phase synchronous motor and the aforesaid constant speed so that the rotor position of the rotary magnet type multi-phase synchronous motor from the position detector is corrected on the basis of this phase correction value. Accordingly, after the incorporation of the position detector into, the rotary magnet type multi-phase synchronous motor, the phase correction value coming from the installation error of the detector is calculated on the basis of the data obtainable therefrom and is used for the control, which can relax the installation accuracy of the detector and can decrease the torque to be decreased to prevent the efficiency of the torque-current characteristic from lowering.

In addition, since the current and the drive voltage of the rotary magnet type multi-phase synchronous motor for the calculation of the phase correction value are components of a current and a drive voltage viewed from the polyphase coordinate system, after the incorporation of the position detector into the rotary magnet type multi-phase synchronous motor, the phase correction value caused by the installation error of the detector is calculated on the basis of the data obtainable therefrom and used for the control. Thus, it is possible to relax the installation accuracy of the detector and to decrease the torque to be generated, thus preventing the efficiency of the torque-current characteristic from decreasing.

Further, since the current and the drive voltage of the rotary magnet type multi-phase synchronous motor for the calculation of the phase correction value are components of a current and a drive voltage viewed from the biaxial coordinate axis, the phase correction value is calculated using the controlled quantities of the d-q axis coordinate system used for the drive control of the rotary magnet type multi-phase synchronous motor, with the result that the operation for the calculation of the phase correction value within the control system becomes simplified.

Furthermore, the phase correction value between a biaxial coordinate axis to be used for the. control based upon the installation error of the position detector and a biaxial coordinate system coming from the conversion of the polyphase ac coordinate system is calculated when the position detector is initially attached to the rotary magnet type multi-phase synchronous motor, and, thereafter, the rotor position of the rotary magnet type multi-phase synchronous motor from the position detector is corrected using the phase correction value stored. Therefore, the calculation of the phase correction value is made only at the replacement of the position detector attached to the rotary magnet type multi-phase synchronous motor, which allows obtaining the phase correction value at a higher speed in the ordinary operation and permits improvement of controllability.

Furthermore, since the phase correction value is calculated on the basis of a value attained in a manner that a value obtained by subtracting the voltage drop due to the armature winding self inductance of the q-axis current component from the d-axis voltage component of the biaxial coordinate axis is divided by a value obtained by subtracting the voltage drop due to the armature winding resistance of the q-axis current component from the q-axis voltage component, the calculation of the phase correction value is made through the use of a simple calculation equation, which makes it possible to perform the calculation operation of the phase correction value at a high speed and enhance the reliability of the phase correction value.

Further, since the phase correction value is made to be the average value of the phase correction value obtained through the normal direction rotation of the rotary magnet type multi-phase synchronous motor and the phase correction value obtained through the reverse direction rotation thereof, the average value of the phase correction values attained in the two different situations is employed, thus averaging the controllability at the rotations in the normal and reverse directions.

Still further, since an elevator winding machine is driven by the rotary magnet type multi-phase synchronous motor and the calculation operation of the phase correction value is made in a state that the elevator car is balanced with the counterweight, the calculation of the phase correction value is made in a state where the load current of the rotary magnet type multi-phase synchronous motor is small, which can minimize the constants of the rotary magnet type multi-phase synchronous motor which vary in accordance with the flowing current quantity and the influence of the flowing current due to the measurement error to improve the measurement accuracy of the phase correction value.

In addition, since the elevator winding machine is driven by the rotary magnet type multi-phase synchronous motor and the phase correction value is set to be the average value of the phase correction value obtained through the rotation of the elevator winding machine in the lifting direction and the phase correction value obtained through the rotation thereof in the lowering direction, the average value of the phase correction values obtained in the two different states is adopted, thereby averaging the controllabilities of the elevator winding machine in the lifting operation and in the lowering operation.

Moreover, the control system for the rotary magnet type multi-phase synchronous motor is composed of a position detector for detecting a magnet position of the rotary magnet type multi-phase synchronous motor, a drive unit for driving the rotary magnet type multi-phase synchronous motor, detection timing detecting means for detecting the fact that the rotary magnet type multi-phase synchronous motor reaches a constant speed, data pick-up means for measuring a current and a drive voltage of the rotary magnet type multi-phase synchronous motor when reaching the constant speed, phase correction value detecting means for calculating the difference in phase between a biaxial coordinate axis to be used for the control based upon an installation error of the position detector and a biaxial coordinate system coming from the conversion of a polyphase ac coordinate system on the basis of the current, the drive voltage, a constant on the rotary magnet type multi-phase synchronous motor and the constant speed, and rotor position correction means for correcting a rotor position of the rotary magnet type multi-phase synchronous motor from the position detector on the basis of a phase correction value detected by the phase correction value detecting means. Thus, after the incorporation of the position detector into the rotary magnet type multi-phase synchronous motor, the phase correction value caused by the installation error of the detector is calculated on the basis of the data obtained therefrom and is used for the control, with the result that it is possible to relax the installation accuracy of the detector and to decrease the torque to be developed, thus preventing the efficiency of the torque-current characteristic from coming down.

Furthermore, since the current and the drive voltage of the rotary magnet type multi-phase synchronous motor for the calculation of the phase correction value are components of a current and a drive voltage viewed from the polyphase coordinate system, after the attachment of the position detector to the rotary magnet type multi-phase synchronous motor, the phase correction value caused by the installation error of the detector is calculated on the basis of the data obtained therefrom and is used for the control, with the result that it is possible to relax the installation accuracy of the detector and to decrease the torque to be developed, thus preventing the efficiency of the torque-current characteristic from decreasing.

Moreover, since the current and the drive voltage of the rotary magnet type multi-phase synchronous motor for the calculation of the phase correction value are components of a current and a drive voltage viewed from the biaxial coordinate axis to be used for the control, the phase correction value is calculated on the basis of the controlled quantity of the d-q axis coordinate system to be used for the control of the rotary magnet type multi-phase synchronous motor, whereby the operation for the calculation of the phase correction value within the control system becomes simple.

Still further, the phase correction value between a biaxial coordinate axis to be used for the control based upon the installation error of the position detector and a biaxial coordinate system coming from the conversion of the polyphase ac coordinate system is calculated when the position detector is initially attached to the rotary magnet type multi-phase synchronous motor, and thereafter the rotor position of the rotary magnet type multi-phase synchronous motor from the position detector is corrected using the phase correction value stored. Therefore, the calculation of the phase correction value is made only at the replacement of the position detector attached to the rotary magnet type multi-phase synchronous motor, which allows obtaining the phase correction value at a higher speed in the ordinary operation and permits improvement of controllability.

Moreover, since the phase correction value is calculated on the basis of a value attained in a manner that a value obtained by subtracting the voltage drop due to the armature winding self inductance of the q-axis current component from the d-axis voltage component of the biaxial coordinate axis is divided by a value obtained by subtracting the voltage drop due to the armature winding resistance of the q-axis current component from the q-axis voltage component, the calculation of the phase correction value is made through the use of a simple calculation equation, which makes it possible to perform the calculation operation of the phase correction value at a high speed and enhance the reliability of the phase correction value.

Further, since the phase correction value is made to be the average value of the phase correction value obtained through the normal direction rotation of the rotary magnet type multi-phase synchronous motor and the phase correction value obtained through the reverse direction rotation thereof, the average value of the phase correction values attained in the two different situations is adopted, thus averaging the controllability at the rotations in the normal and reverse directions.

Still further, since an elevator winding machine is driven by the rotary magnet type multi-phase synchronous motor and the calculation operation of the phase correction value is made in a state that the elevator car is balanced with the counterweight, the calculation of the phase correction value is made in a state where the load current of the rotary magnet type multi-phase synchronous motor is small, which can minimize the constants of the rotary magnet type multi-phase synchronous motor which varies in accordance with the flowing current quantity and the influence of the flowing current due to the measurement error to improve the measurement accuracy of the phase correction value.

In addition, since the elevator winding machine is driven by the rotary magnet type multi-phase synchronous motor and the phase correction value is set to be the average value of the phase correction value obtained through the rotation of the elevator winding machine in the lifting direction and the phase correction value obtained through the rotation thereof in the lowering direction, the average value of the phase correction values obtained in the two different states is adopted, thereby averaging the controllabilities of the elevator winding machine in the lifting operation and in the lowering operation.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A method of controlling a rotary magnet multi-phase synchronous motor using a position detector for detecting a magnet position of the synchronous motor, and a drive unit for driving the synchronous motor, the control method comprising:

driving a synchronous motor including a position detector using a drive unit to detect when said synchronous motor reaches a constant speed;

measuring a current and a drive voltage of said synchronous motor when said synchronous motor reaches a constant speed;

calculating a phase correction value between a biaxial coordinate axis used for control based on installation error of said position detector and a biaxial coordinate system due to conversion of a polyphase AC coordinate system based on measured current, measured drive voltage, a constant of said synchronous motor, and the constant speed; and correcting rotor position of said synchronous motor based on the phase correction value.

2. The method as defined in claim 1, wherein the current and drive voltage are components of a current and a drive voltage viewed from the polyphase AC coordinate system.

3. The method as defined in claim 1, wherein the current and drive voltage are components of a current and a drive voltage viewed from the biaxial coordinate axis.

4. The method as defined in claim 1, including calculating the phase correction value between the biaxial coordinate axis based on the installation error of said position detector and the biaxial coordinate system due to conversion of the polyphase AC coordinate system when said position detector is initially attached to said synchronous motor, and thereafter correcting the rotor position of said synchronous motor based on a stored phase correction value.

5. The method as defined in claim 3, including calculating the phase correction value by subtracting a voltage drop due to an armature winding self inductance and a q-axis current component from a d-axis voltage component of the biaxial coordinate axis to produce a first difference, subtracting a voltage drop due to an armature winding resistance and the q-axis current component from a q-axis voltage component to produce a second difference, and dividing the first difference by the second difference.

6. The method as defined in claim 1, wherein the phase correction value is an average of a phase correction value obtained through a forward rotation of said synchronous motor and a phase correction value obtained through reverse rotation of said synchronous motor.

7. The method as defined in claim 1, including using said synchronous motor to drive an elevator winding machine, and calculating the phase correction value where an elevator car and a counterweight of the elevator car are balanced.

8. The method as defined in claim 1, including using said synchronous motor to drive an elevator winding machine, and calculating the phase correction value as an average of a phase correction value obtained when the elevator winding machine is driven in a lifting direction and a phase correction attained when the elevator winding machine is driven in lowering direction.

9. A control system for a rotary magnet multi-phase synchronous motor comprising:

a position detector for detecting a magnet position of a synchronous motor;

a drive unit for driving the synchronous motor;

detection timing detecting means for detecting when the synchronous motor reaches a constant speed;

data pick-up means for measuring a current and a drive voltage of the synchronous motor when the synchronous motor reaches the constant speed;

phase correction value detecting means for calculating a difference in phase between a biaxial coordinate axis based upon installation error of said position detector and a biaxial coordinate system resulting from conversion of a polyphase AC coordinate system based on the measured current, the measured drive voltage, a constant of the synchronous motor, and the constant speed; and rotor position correction means for correcting rotor position of the synchronous motor based on a phase correction value detected by said phase correction value detecting means.

10. The control system as defined in claim 9, wherein the current and the drive voltage of the synchronous motor are components of a current and a drive voltage viewed from the polyphase AC coordinate system.

11. The control system as defined in claim 9, wherein the current and the drive voltage of the synchronous motor are components of a current and a drive voltage viewed from the biaxial coordinate axis.

12. The control system as defined in claim 9, wherein the phase correction value between the biaxial coordinate axis based on the installation error of said position detector and the biaxial coordinate system due to the conversion of the polyphase AC coordinate system is calculated when said position detector is initially attached to the synchronous motor, and thereafter the rotor position of the synchronous motor is corrected based on a stored phase correction value.

13. The control system as defined in claim 11, wherein the phase correction value is calculated by:

subtracting a voltage drop due to an armature winding self inductance and a q-axis current component of a d-axis voltage component of the biaxial coordinate axis to produce a first difference;

subtracting a voltage drop due to armature winding resistance and the q-axis current component from a q-axis voltage component to produce a second difference; and dividing the first difference by the second difference.

14. The control system as defined in claim 9, wherein the phase correction value is an average of a phase correction value obtained when the synchronous motor is driven in a forward direction and a phase correction value obtained when the synchronous motor is driven in a reverse direction.

15. The control system as defined in claim 9, wherein the synchronous motor is an elevator winding machine, and the phase correction value is calculated when an elevator car and a counterweight of the elevator, driven by the elevator winding machine, are balanced.

16. The control system as defined in claim 9, wherein the synchronous motor is an elevator winding machine, and the phase correction value is an average value of a phase correction value obtained when the elevator winding machine is driven in a lifting direction and a phase correction value obtained when the elevator winding machine is driven in a lowering direction.

\* \* \* \* \*